United States Patent [19]
Ingram

[11] Patent Number: 5,423,587
[45] Date of Patent: Jun. 13, 1995

[54] CAMPER SHELL FOR PICKUP TRUCK WITH LUMBER RACK

[76] Inventor: Brian L. Ingram, P.O. Box 546, Redwood Valley, Calif. 95470

[21] Appl. No.: 95,170

[22] Filed: Jul. 20, 1993

[51] Int. Cl.⁶ .......................... E04H 15/06; B60P 3/00
[52] U.S. Cl. ........................................... 296/3; 296/10; 296/100; 296/164; 224/42.45 R; 135/88.13
[58] Field of Search .................. 296/3, 100, 102, 104, 296/159, 164, 165, 10; 224/42.45 R; 135/88.13

[56] References Cited

U.S. PATENT DOCUMENTS

| | | | |
|---|---|---|---|
| 1,538,384 | 5/1925 | Crockett et al. | 296/102 |
| 3,752,528 | 8/1973 | Barker | 296/104 X |
| 3,765,713 | 10/1973 | Suitt | 296/3 |
| 3,955,845 | 4/1976 | Ingram | 296/10 |
| 4,088,363 | 5/1978 | Palmer . | |
| 4,569,554 | 2/1986 | Dodgen | 296/102 X |
| 4,813,734 | 3/1989 | Hoover | 296/100 |
| 4,815,786 | 3/1989 | McRay | 296/165 |
| 4,915,440 | 4/1990 | Daniel et al. | 296/104 |
| 5,002,324 | 3/1991 | Griffin | 296/3 |
| 5,002,329 | 3/1991 | Rafi-Zadeh | 296/100 |

*Primary Examiner*—Dennis H. Pedder
*Attorney, Agent, or Firm*—Elliot B. Aronson

[57] ABSTRACT

A combination camper shell and lumber rack for a pickup truck. A framework is mounted on the truck and used as a lumber rack when the covering shell is not installed, and then when desired the lumber rack is readily converted to a framework for supporting a covering shell. The lumber rack is structured so that it may be converted to a full camper shell frame by setting in place several rafter members that are adapted to be removably mounted across the top of the lumber rack frame to define the camper top profile. A flexible foldable soft top is shaped and arranged to extend over the lumber rack frame with the rafters in position and to be secured in position so as to enclose the frame. The walls of the shell are formed of a fabric, plastic or equivalent material shaped to cooperate with the frame and be supported thereby to define the camper covering sheet. The frame and covering sheet are formed to provide a profile reducing adverse aerodynamic effects and permitting the vehicle to be driven comfortably at higher speeds with the camper shell installed. The covering sheet and frame are structured so that the covering sheet may be removed and the full framework partially disassembled quickly and easily by a single person, leaving a fully functional lumber rack in place on the pickup truck.

1 Claim, 4 Drawing Sheets

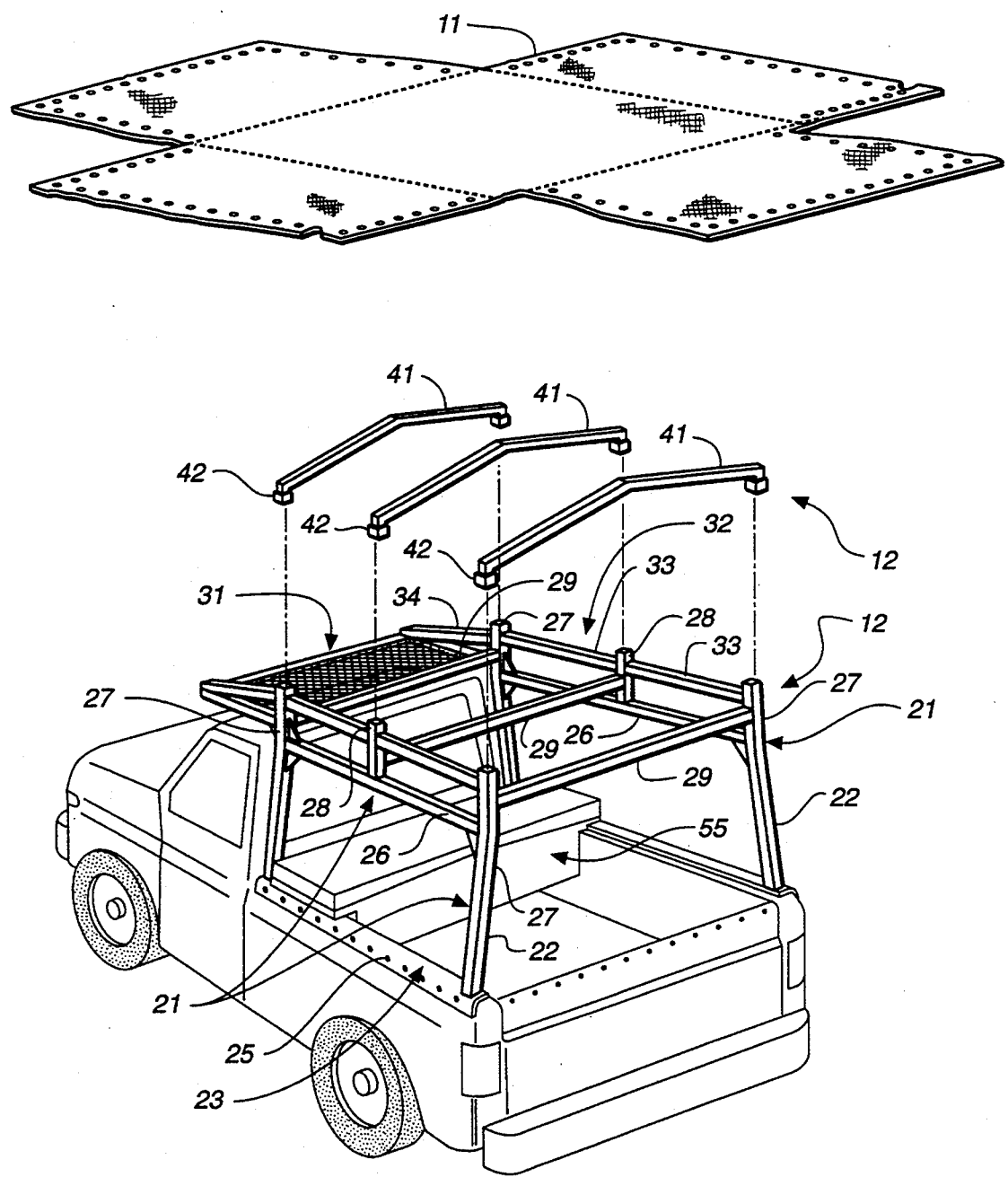
FIG._1

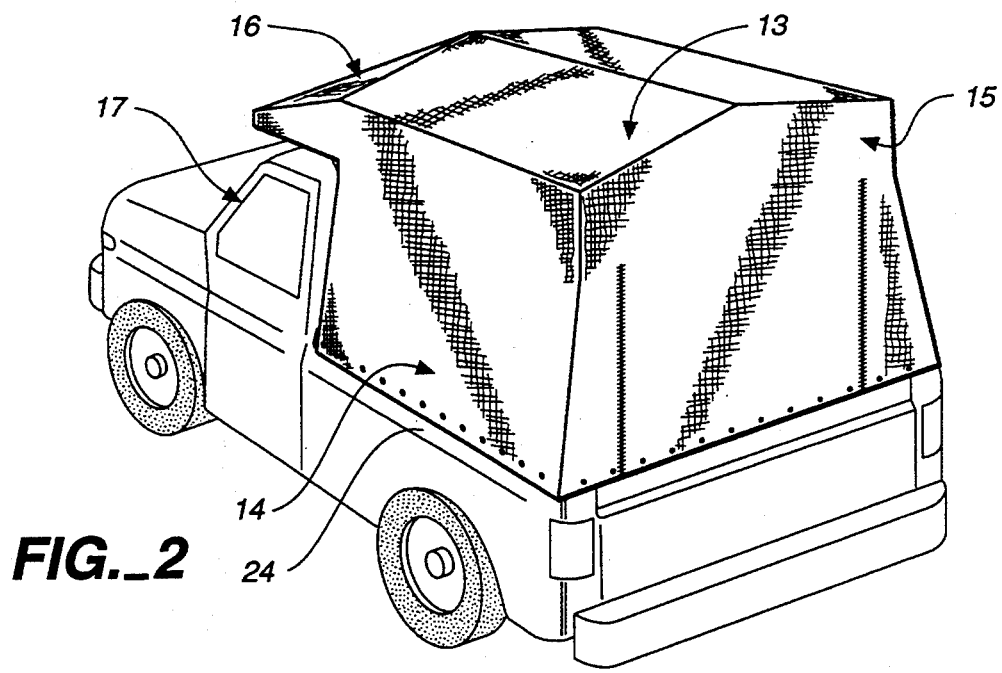
FIG._2
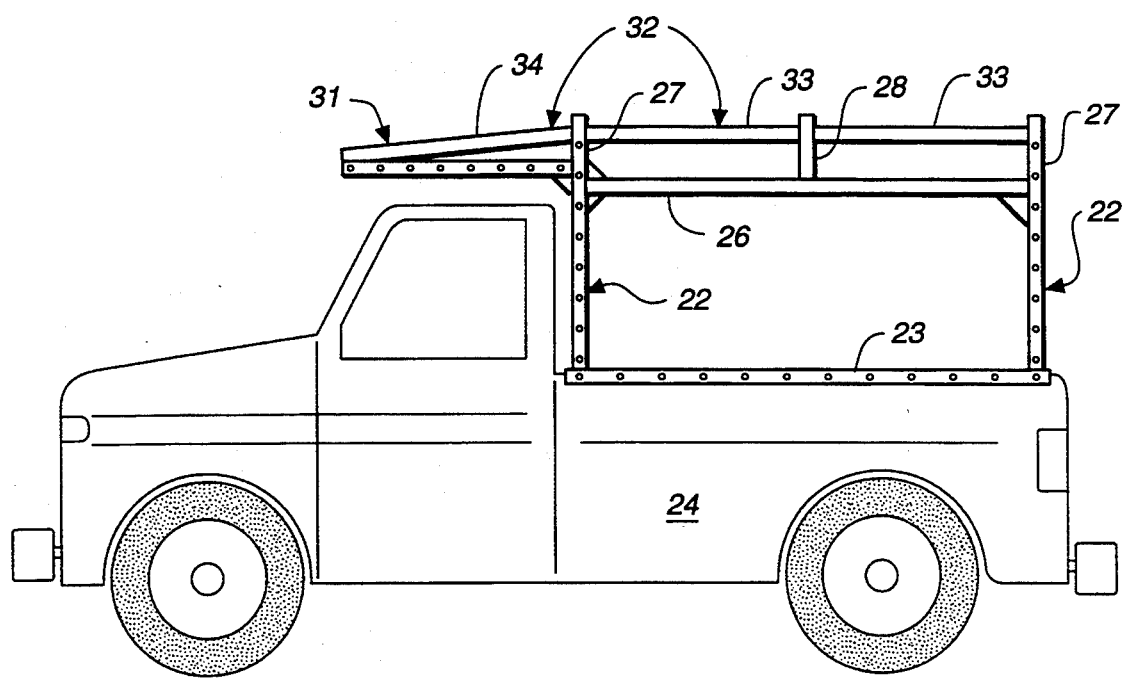
FIG._3

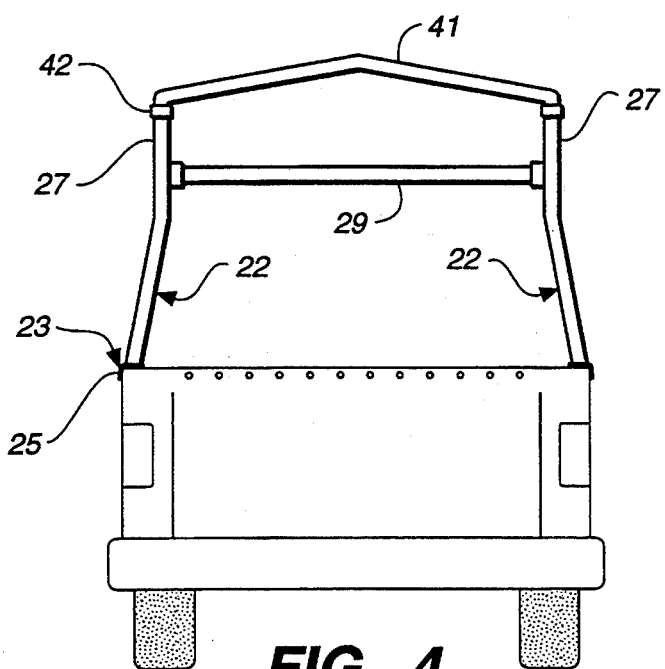
FIG._4
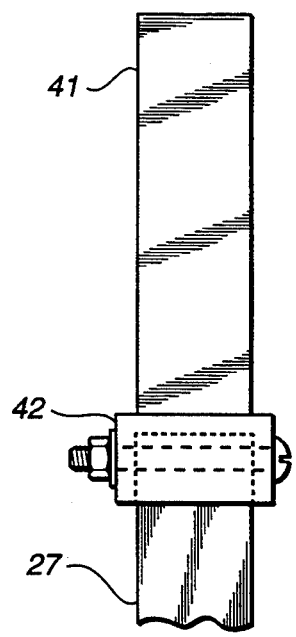
FIG._7
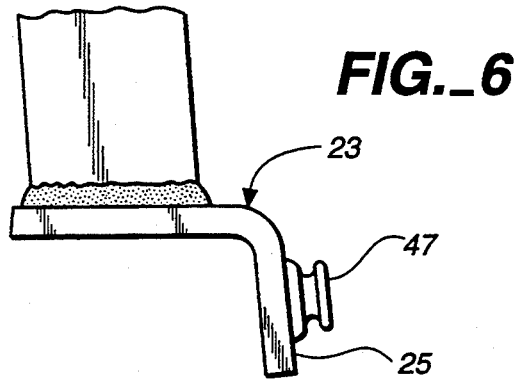
FIG._6
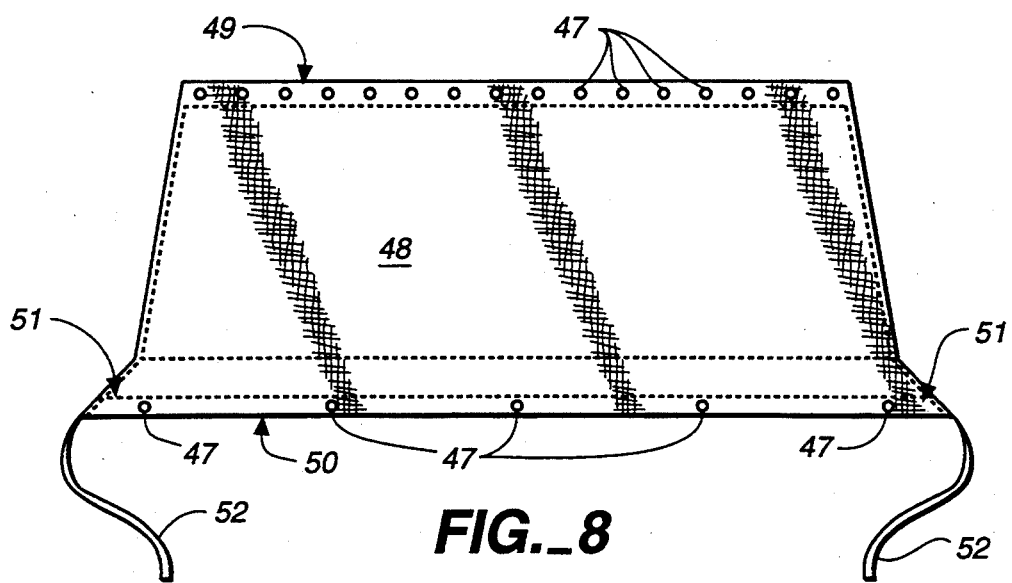
FIG._8

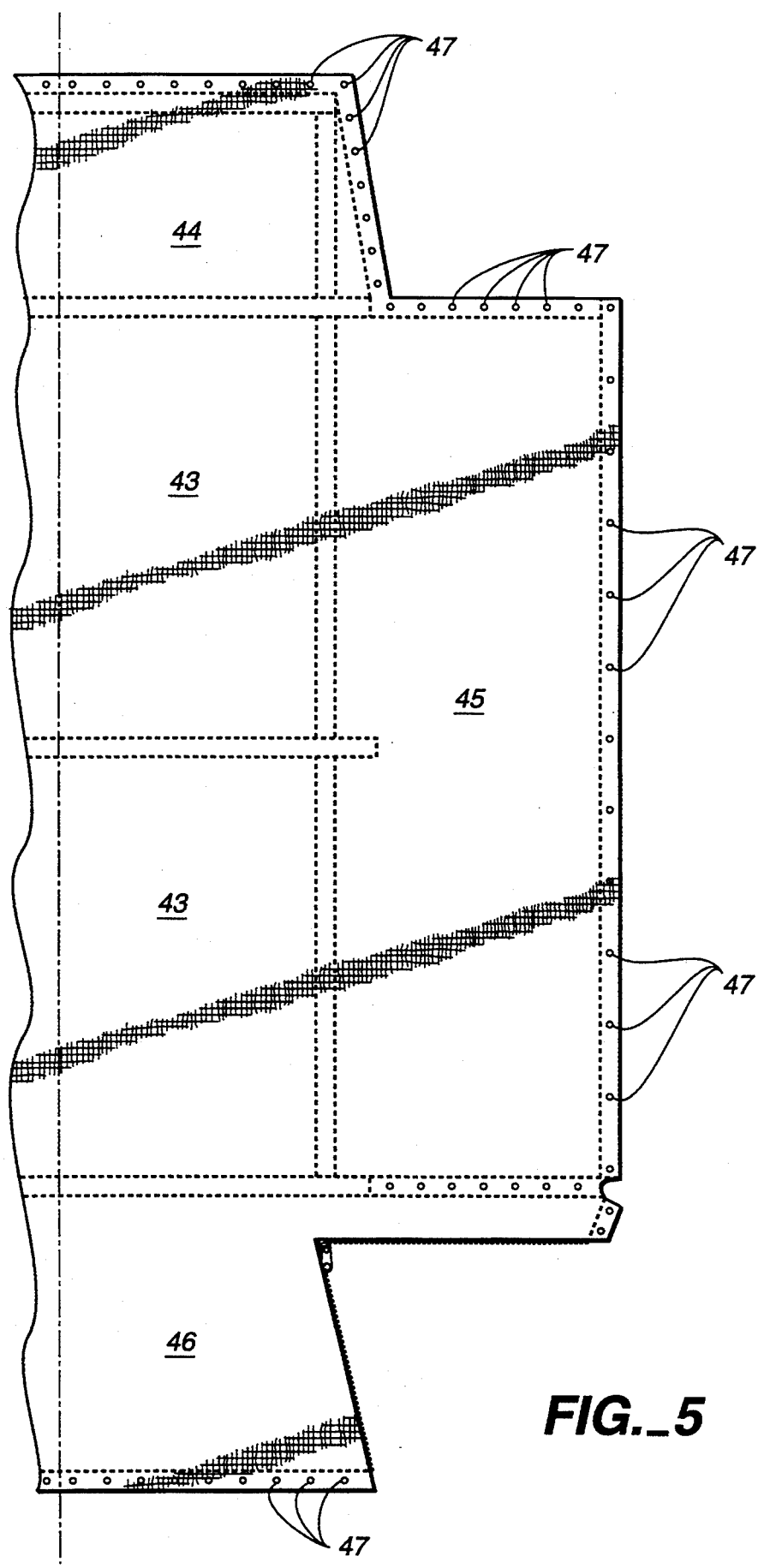
FIG._5

CAMPER SHELL FOR PICKUP TRUCK WITH LUMBER RACK

BACKGROUND OF THE INVENTION

This invention relates generally to removable camper shells or tops for use with pickup trucks, and is more particularly concerned with camper shells for pickup trucks in which a lumber rack is installed.

The popularity of camper tops for pickup trucks is well known. They are used to convert the bed of the pickup truck into a sizable enclosed space. With a camper top the pickup truck may be used as a recreational vehicle for camping or may be used simply as an enclosed truck for protecting a load from the elements.

The camper top for a pickup has the advantage that it may be removed so that the truck serves a dual purpose. Without the top the truck may be used as an open-bed pickup. With the top the truck is converted into an enclosed camper. Although one of the advantages of a camper top for a pickup is that when desired the pickup may still be used as an open-bed vehicle, the construction of known camper tops tends to thwart this advantage because camper tops tend to be heavy and awkward and thus not easy to install or remove. Thus, the owners of camper tops are often discouraged from using them or from removing them once installed except in the most urgent need. Various camper top constructions have been devised in an attempt to circumvent this disadvantage. U.S. Pat. No. 4,815,786 to McRay, for example, discloses a collapsible camper top with telescoping metal side walls that collapses into a stored configuration in the bed of the pickup permitting the pickup bed to be used while the collapsed camper top is stored there. Another hard-shell camper top construction attempting to ease the installation process is disclosed in U.S. Pat. No. 5,002,329 to Rafi-Zadeh. In further attempts to circumvent the above-noted disadvantage, camper tops have been devised that are formed of a lighter-weight fabric or plastic covering that is installed over a removable or collapsible frame mounted on the pickup body. An example of this type of camper top is found in U.S. Pat. No. 4,813,734 to Hoover. U.S. Pat. No. 4,088,363 to Palmer discloses yet another attempt to make it easy to set up and break down a camper top for a pickup. In the Palmer patent a frame with flexible fabric or fabric-like covering collapses into the bed of the pickup and unfolds to form an enclosed camper or tent-like structure that partially rests on the ground behind the pickup. This form of solution of course can only be deployed when the pickup is stationary.

The problems of camper tops for pickups are heightened when the pickup carries a lumber rack. Pickups used in certain occupations, typically in the construction industry, are often outfitted with a lumber rack, which is a framework set up on the bed of the vehicle to carry oversized and awkward loads such as lumber or other construction materials. When equipped with a lumber rack, the vehicle also commonly includes a tool box shaped to fit in the bed and extending crosswise the full width of the bed. Thus, when it is desired to install the camper top, it is necessary first to remove the lumber rack and tool box, which is yet another operation that must he completed in the process of converting between an open-bed and enclosed truck. The lumber rack and tool box thus provide a further practical deterrent to full use and enjoyment of the traditional pickup truck camper top.

SUMMARY OF THE INVENTION

The present invention provides a camper shell for a pickup truck that may be used when the truck is equipped with a lumber rack and yet that overcomes the above disadvantages in that it is lightweight, easy to install, and especially easy to remove and store when the lumber rack is in place.

The invention provides a framework that may be mounted on the truck and used as a lumber rack when the covering shell is not installed, and then when desired the lumber rack may readily be converted to a framework for supporting a covering shell. Briefly, the lumber rack is structured so that it may be converted to a full camper shell frame by setting in place several rafter members that are adapted to be removably mounted across the top of the lumber rack frame to define the camper top profile. A flexible foldable soft top is shaped and arranged to extend over the lumber rack frame with the rafters in position and to be secured in position so as to enclose the frame and define a sizable functional enclosed camper space. The walls of the shell are formed of a fabric, plastic or equivalent material shaped to cooperate with the frame and be supported thereby to define the camper shell. The frame and covering are formed to provide an aerodynamically desirable profile reducing adverse aerodynamic effects and permitting the vehicle to be driven comfortably at higher speeds with the camper shell installed. It is an advantage of the invention that the covering may be removed and the full framework partially disassembled quickly and easily by a single person, leaving a fully functional lumber rack in place on the pickup truck.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is an overall exploded perspective view of a pickup truck with all embodiment of a camper shell framework and covering skin according to the invention.

FIG. 2 is an overall perspective view of a pickup truck with a camper shell according to the invention.

FIG. 3 is an elevational view of a pickup truck carrying the lumber rack framework alone.

FIG. 4 is a rear elevational view of a pickup with the camper shell framework mounted thereon.

FIG. 5 is a plan view showing one-half of a symmetrical pattern for the material top fitting over the camper frame, the other half being a mirror image of the half depicted.

FIG. 6 is a rear elevational view of a bottom rail for mounting on the sides of the pickup.

FIG. 7 is an elevational view of the end of a rafter member mounted on a post.

FIG. 8 is a plan view of an additional panel for the material top.

DETAILED DESCRIPTION OF ILLUSTRATIVE EMBODIMENTS

FIGS. 1 and 2 show an illustrative embodiment of a camper shell framework according to the invention installed on a pickup truck. The shell comprises a flexible, foldable covering sheet material 11 forming the surface or skin of the shell, which is supported on a frame indicated generally at reference numeral 12. The material 11 may be provided by a suitably waterproof material such as a treated or plasticized fabric material of the type commonly used for tents, for example. The installed shell has a roof portion 13, side portions 14, rear portion 15, and overcab portion 16 extending over the cab 17 of the pickup truck.

Frame 12, mounted to the bed of the pickup, includes a pair of side frame members indicated generally at reference numeral 21. Each side frame member is adapted to be mounted at a side of the pickup truck bed. The side frame members provide vertically extending corner posts 22 at the forward and rear corners of the pickup truck bed. As illustrated in FIGS. 1 and 3 each side frame member 21 includes a first horizontal rail member 23 at its base that is structured to rest on and conform generally to the upward edge of the side panel 24 defining the truck bed. Rail member 23 generally runs the length of the upward edge of side panel 24. Rail member 23 may be formed, for example, with a downwardly angled piece 25 (see FIG. 6) along its outer edge roughly in the shape of conventional angle iron, which serves to align the rail member quickly and easily in position along the pickup bed side panel. The downwardly angled piece also provides a convenient surface for hold dot snaps or other fasteners as discussed below for securing the cover sheet material 12 to the frame. In this way it is not necessary to drill holes in the side panels of the truck to attach the fasteners. Rail member 23 is secured to the pickup side panel for example, by bolting along its length.

A second horizontal rail member 26 runs generally parallel to the first rail member 23 and is firmly fixed to the corner posts 22 at their upper portions such as by welding. Posts 22 have a portion 27 extending above rail member 26. In the embodiment illustrated here the lower portion of each corner post 22 is angled inward toward the centerline of the truck as it extends upward from its bottom end secured to bottom rail member 23 to the second horizontal rail member 26. Above rail member 26 the post rises vertically as indicated at portion 27. (See FIG. 4.) Each side frame member 21 may further include at least one intermediate post 28 secured to and extending vertically from horizontal rail member 26 positioned intermediate between the corner posts 22.

Side frame members 21 are secured to one another and held in fixed spaced apart relation to one another by a plurality of horizontal support members 29 in the form of cross bars. The support members 29 are mounted in position across the pickup bed at the upper portion of side frame members 21. Support members 29 are all mounted on the same level so as to define a plane for supporting lumber or the like. Support members 29 may be secured to side frame members 21 in a manner permitting them to be easily detached from the side frame members providing for easy break down and compact storage of the framework when it is desired to remove the framework from the pickup completely. For example, side frame members 21 may be provided with saddle brackets on vertical posts 27 and 28 as illustrated diagrammatically in FIG. 4, in which the cross bar support members 29 may simply be dropped and bolted into position. Alternatively, the posts 27 and 28 may be provided with projections or prongs that may be slid into the hollow cross bar support members 29.

Frame 12 also includes an overcab frame member 31 that extends horizontally over the pickup truck cab. Overcab frame member 31 is preferably positioned at the same level as support members 29 so that frame member 31 and support members 29 define a common plane to serve as a flat carrying surface for lumber or the like. The overcab frame member is illustrated here extending all the way over the cab as is common with pickup truck lumber racks. However, frame member 31 may be formed to extend only partially over the cab as may be desirable for any specialized application. Overcab frame member 31 will be referred to here as extending "over" the cab whether the member extends partially or fully over the cab. Frame member 31 may be permanently secured to a cross bar support member 29 or it may be separately bolted to the cross bar support member. Assembly and disassembly of the lumber rack framework are easier, however, if overcall frame member 31 is permanently attached to its own cross bar support member.

For additional support each side frame member 21 further includes a support member 32 that has a horizontal portion 33 running generally parallel to the horizontal rail members 23 and 26. The support member horizontal portions 33 are secured generally at the upper end of the vertical posts 27. For extra support of overcab frame member 31, support member 32 also has a downwardly sloping portion 34 serving as an overcab suspension brace. Slopping portion 34 runs generally downward from the upper end of the vertical post 27 at the forward corner of the truck bed to the forward extremity of the overcab frame member 31. Sloping portion 34 may of course be bolted or otherwise removably secured at either or both of its ends so that the overcab frame member may be separated from the side frame members 21 at the time of disassembly to facilitate storage.

Frame 12 as described thus far is a self-contained unit that serves as a lumber rack when mounted by itself on the pickup, and this portion of frame 12 may be referred to herein as the lumber rack frame. Frame 12 as described thus far is especially suited to be transformed quickly and easily into a camper shell without the need to remove the lumber rack frame. For this purpose frame 12 is provided with a plurality of rafter members 41 such as illustrated in FIGS. 1 and 4. Each rafter member is formed at its ends to be mountable on top of and extending across the lumber rack frame. More specifically, as illustrated here rafter members 41 are formed to be mounted on the top of corner posts 22 and intermediate posts 28 in such a manner that they are also readily demountable from the lumber rack frame. For this purpose the rafter members of the illustrated embodiment are provided with hollow cup-shaped members 42 at their ends fitting over and receiving the upper ends 27 of corner posts 22 and intermediate posts 28. The rafter members may be secured in position with bolts as illustrated in FIG. 7. The bolts preferably run fore and aft so as not to interfere with the overlying covering. The covering itself will of course also tend to hold the rafter members in position. The rafter members themselves are shaped to define an upwardly convex profile, which reaches above the level of overcab frame member 31 when mounted on the lumber rack frame. A first rafter member is mounted across the lumber rack frame generally at the corner posts at the forward corners of the truck bed, a second rafter member is mounted across the lumber rack frame generally at the corner posts at said rear corners of the truck bed, and further rafter members may be mounted across tire lumber rack frame at any intermediate posts. The convex profile of rafter members 41 defines the shape of the camper roof when the skin is placed in position.

The skin 11 is shaped to cover the upwardly convex profile of rafter members 41 and to extend over overcab frame member 31 sloping generally downward from first rafter member to the forward extremities of the overcab frame member. Skin 11 further extends downward over side frame members 21 and over the back of the lumber rack frame to enclose the lumber rack frame. FIG. 5 illustrates the shape of skin 11. One-half of skin 11 is seen in FIG. 5, and the other half is a mirror image with allowance being made for the convex profile of the top at 13. The central portion 43 forms the top portion overlying rafter members 41. Front panel 44 overlies overcab frame member 31. Side panels 45 hang down to cover side frame members 21, and rear panel 46 hangs down to cover the rear of the camper enclosure. Skin 11 is provided with releasable fasteners 47 along its edges for securing the edges to the adjacent frame members, which are provided with mating fasteners. Dot snap fasteners or bayonet-type twist fasteners have been found suitable, but those skilled in the mechanical arts will recognize that other types of fasteners may also be used. Those skilled in the art will appreciate without the need for detailed exposition here that sturdier fasteners such as twist fasteners should preferably be used at points of heavier use, e.g., at points where greater stress is exerted during installation, and places of greater wear on the sheet material such as at corners of the frame should preferably be reinforced.

In addition to the main covering sheet material, a separate panel 48 may optionally be provided to cover the inside of the camper enclosure against the back of the pickup cab. Panel 48 is secured along its top edge 49 to the inside face of the forward-most support member 29 and along its bottom edge 50 to the forward edge of the pickup bed. Tabs 51 are provided with tie-downs 52, which may be tied to cleats mounted on the pickup bed side panels.

Shaped in the general manner described and illustrated herein, the camper top presents an aerodynamic profile permitting the truck to be driven comfortably at highway speeds without introducing excessive adverse aerodynamic reactions that could otherwise lead to instability of the vehicle or poor gas milage.

The construction disclosed herein is also advantageous in that it may be used conveniently with a truck-bed tool box 55 mounted permanently in the pickup bed. In the illustrated embodiment the tool box may be mounted on the bottom horizontal rails 23 of side frame members 21 in its customary position against the cab. The tool box is then readily accessible from outside the truck simply by releasing several of the fasteners 47 at the corner of covering skin 11 by the tool box. The corner of skin 11 may then be flipped up to provide access to the tool box. An additional fastener of tie-downmay be provided to hold the corner in its flipped-up position.

Another advantage of the construction disclosed herein is that the side panels 45 and rear panel 46 may simply be rolled up to form a camper top with open sides for providing shade while permitting a breeze to blow through the pickup bed. The rolled up side and back panels may be provided with tie downs, loops or other securement means for retaining the rolled up panels in position.

It will be appreciated that the camper shell and lumber rack combination of the present invention may be sold as a unit, which may be installed and used as a lumber rack and then quickly and easily converted to an enclosed shell when desired. It is a feature of the invention that this conversion may readily be accomplished by a single person using only a few simple tools, if any at all, for tightening the rafter members in position. Alternatively, the lumber rack frame may be sold separately as a conventional pickup truck lumber rack, and a separate retrofit kit maybe provided for converting the lumber rack to the enclosed shell.

he above descriptions and drawings disclose illustrative embodiments of the invention. Given the benefit of this disclosure, those skilled in the art will appreciate that various modifications, alternate constructions, and equivalents may also be employed to achieve the advantages of the invention. For example, although illustrated here for a pickup truck with a short cab having only a front seating area, those skilled in the art will readily be able to adjust the design and dimensions of the illustrated embodiment to apply to other sized vehicle designs including, for example, the so-called cab-and-a-half pickup trucks that include forward and rear seating or storage area. Similarly, the design is readily adaptable for short-bed and long-bed pickups. Therefore, the invention is not to be limited to the above description and illustrations, but is defined by the appended claims.

What is claimed is:

1. A convertible lumber rack and camper shell kit for a pickup truck having a cab and a bed, comprising:

a lumber rack frame for mounting on the pickup truck, including:

a pair of side frame members of one-piece construction, each side frame member comprising:

forward and rear posts disposed so as to extend vertically at forward and rear corners of the pickup truck bed respectively when said lumber rack frame is in assembled configuration on the pickup truck;

a first elongate rail member structured to rest on and conform generally to the upward edge of the side panel defining the truck bed and sized to extend the length of said upward edge when said lumber rack frame is in assembled configuration on the pickup truck, said forward and rear posts being fixed at their bottom ends to said first elongate rail member;

a second elongate rail member running generally parallel to said first elongate rail member and being fixed to said forward and rear posts at the upper portion thereof and below the upper ends thereof, wherein said forward and rear posts extend above said second elongate rail member; and at least one intermediate post secured to and extending vertically from said second elongate rail member intermediate between said forward and rear posts;

wherein said forward and rear posts are shaped to angle inward from their bottom ends to said second elongate rail member and to extend vertically upward from said second elongate rail member when said lumber rack frame is in assembled configuration on the pickup truck;

wherein said posts and said rails are permanently joined together to form a single fixed structure such that each said side frame member is mountable on and demountable from said pickup truck bed as a single unit;

a plurality of elongate support members, and
means for removably mounting each said support member at each of its ends on a respective side frame member so as to extend horizontally from one of said side frame members to the other and maintain said side frame members in fixed spaced-apart relationship, said elongate support members being mountable on said side frame members so as to define a horizontal plane disposed at the upper portion of said side frame members for supporting lumber or the like thereon when said lumber rack frame is in assembled configuration on the pickup truck; and an overcab frame member of one-piece construction defining a planar platform disposed so as to extend horizontally over the pickup truck cab when said lumber rack frame is in assembled configuration on the pickup truck, wherein said overcab frame member is mountable on and demountable from said side frame members as a single unit; and means for removably mounting said overcab frame member to said side frame members;

plurality of rafter members,
each said rafter member being formed at its ends to receive and fit over the upper ends of said forward, intermediate, and rear posts for mounting thereon so as to extend from one of said side frame members to the other across and on top of said lumber rack frame when said lumber rack frame is in assembled configuration on the pickup truck, each said rafter member being generally wedge-shaped to define a central peak so that said plurality of rafter members define a central ridge extending fore and aft above the level of said overcab frame member when said lumber rack frame is in assembled configuration on the pickup truck and a first rafter member is mounted across said lumber rack frame at said forward posts, and a second rafter member is mounted across said lumber rack frame at said rear posts, and a third rafter member is mounted across said lumber rack frame at said intermediate posts;

a flexible foldable covering sheet material shaped to extend over said central ridge of said rafter members and over said overcab frame member when said lumber rack frame and plurality of rafter members are in assembled configuration on the pickup truck, sloping generally downward from said first rafter member to the forward extremities of said overcab frame member, and further shaped to extend downward over said side frame members and downward generally from said second rafter member over the back of said lumber rack frame; and means for securing said covering sheet material at the edges thereof to said lumber rack frame.

* * * * *